July 17, 1962 F. A. HURD 3,044,835
LINEAL ANTI-FRICTION BEARING
Filed July 11, 1958 6 Sheets-Sheet 1

Fraser A. Hurd INVENTOR.
BY

July 17, 1962

F. A. HURD 3,044,835

LINEAL ANTI-FRICTION BEARING

Filed July 11, 1958

INVENTOR.
Fraser A. Hurd
BY

July 17, 1962
F. A. HURD
3,044,835
LINEAL ANTI-FRICTION BEARING
Filed July 11, 1958
6 Sheets-Sheet 4
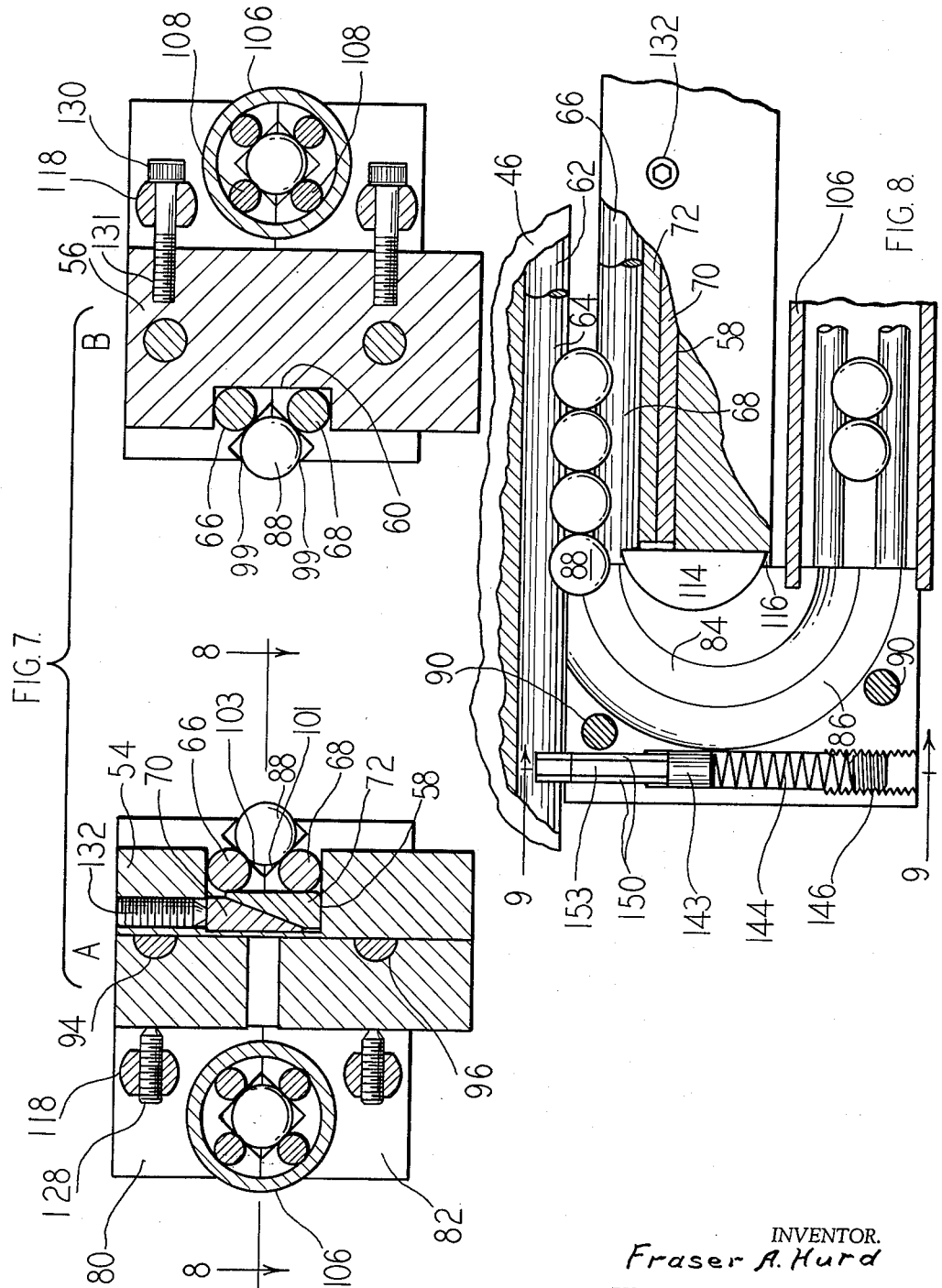
INVENTOR.
Fraser A. Hurd
BY

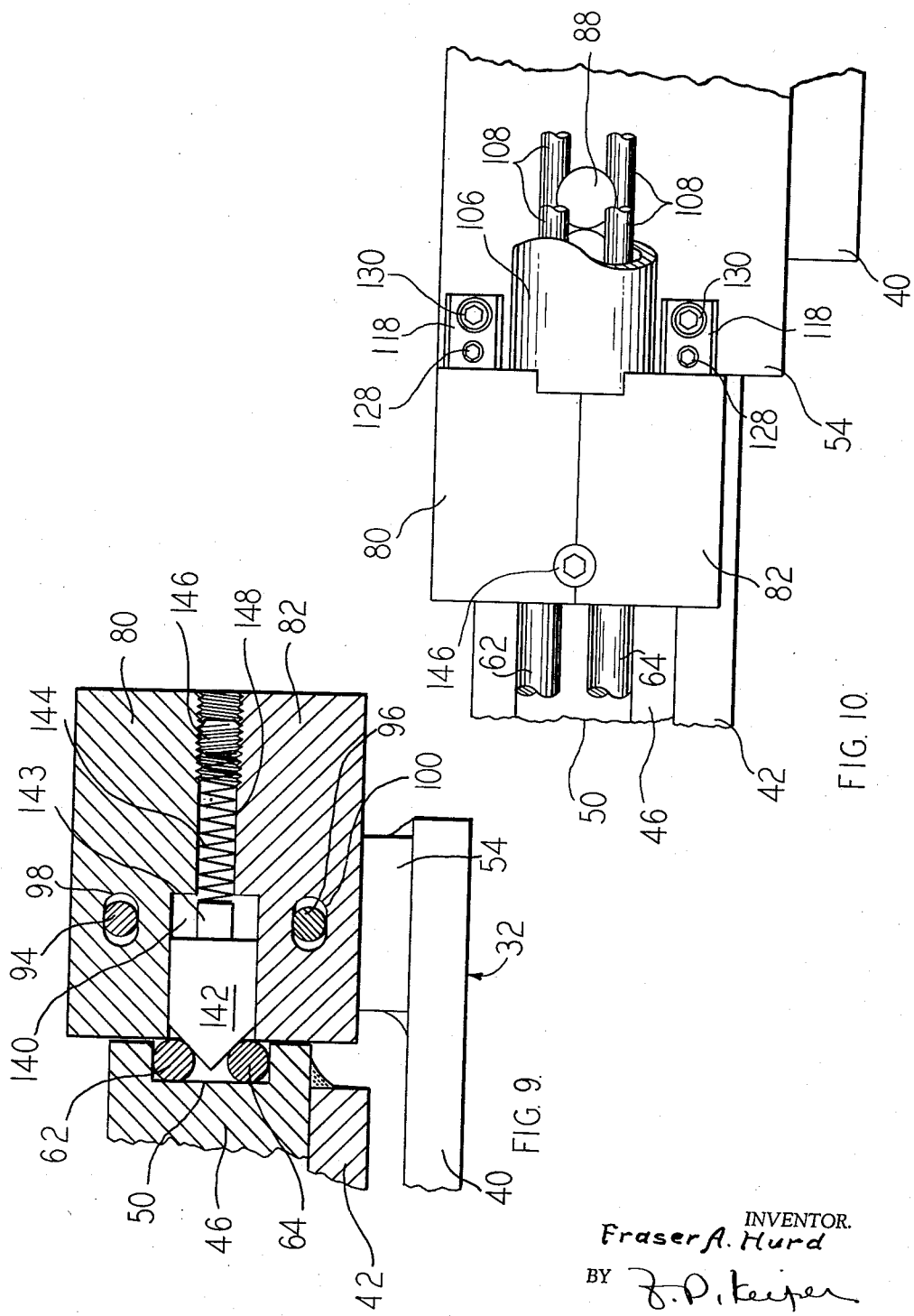

July 17, 1962

F. A. HURD 3,044,835

LINEAL ANTI-FRICTION BEARING

Filed July 11, 1958

Fraser A. Hurd INVENTOR.

BY

United States Patent Office 3,044,835
Patented July 17, 1962

3,044,835
LINEAL ANTI-FRICTION BEARING
Fraser A. Hurd, 103 5th St., Liverpool, N.Y.
Filed July 11, 1958, Ser. No. 747,895
12 Claims. (Cl. 308—6)

This invention relates to anti-friction ways and more particularly to ways employing anti-friction roller means, having return loops for the friction means.

In the machine tool art and elsewhere, wherein heavy tool carriages move along extended beds provided with ways, it is desirable to eliminate friction within limited space requirements. Where the movement of the carriage is somewhat limited, balls disposed in line in opposed V tracks affixed to the movable member and supporting member and provided with retaining cages have been provided, the anti-friction balls providing rolling support therebetween. In such an arrangement, the opposed track ways are usually of like length, and the cage support provided for the anti-friction balls is limited to a length equal to the minimum overlap of the opposed track ways, which occurs at the end limits of the movement provided for. In similar arrangements involving caged rolling elements wherein the opposing track way is considerably longer than its gibbed mate, the capability of the protruding cage to hold and retain the idle balls outside the loaded zone, definitely limits the range of linear travel to relatively short strokes. Furthermore the free cage arrangement is limited to relatively light loads and pre-loading, inasmuch as the cage and its complement of balls will invariably creep one way or the other and will therefore require an occasional repositioning by applying force on the cage end that is farthest protruding, an action not deemed feasible for heavy tool carriages and tables. In addition the protruding cage makes sealing against dirt and foreign matter extremely difficult and requires that special attention be given the design so as to help shield and envelop the protruding cage and balls. The retainers considered necessary for the anti-friction balls in such a device usually require spacing between adjacent balls, and thereby prevent the employment of a series of balls in near contact, which in turn would carry the greatest load for a given length.

The present invention is directed to the provision of a return track way or closed loop for the balls whereby maximum support for a carriage of minumum length is attained. The invention further has to do with provision for accurately guiding anti-friction balls to and from the return loop out of and into the load sustaining position between the opposed track ways of the carriage and the supporting member.

An object of this invention is to provide a line of anti-friction bearings for linear motion (comparable to well known anti-friction shaft bearings) capable of use in place of the conventional hand-scraped or ground dovetail slide and which line of linear anti-friction bearings provides superior features such as adjustable pre-loading in combination with low "break-away" friction.

Heretofore, in machine tools constructed dominately of cast iron, the problems related to linear motion were not too difficult for solution principally because cast iron against cast iron works fairly well as a sliding bearing when properly hand scraped and "flaked" to provide voids for the lubricant. However, with the advent of the fabricated steel structure the problem of linear slide is extremely acute since the machined surfaces of structural shapes and similar steels are stringy, generally rough and somewhat "slivery." The surfaces thus presented are very unsuited for direct bearing surfaces and the sliding of steel against steel is susceptible to scoring, galling, pick-up, snow-balling, etc. In contrast this invention eliminates these difficulties by providing "rails" of substantially cylindrical section which smoothly bridge the uniform irregularities inherent in machining. Use of hardened and ground friction surfaces for ways has not been an entirely satisfactory solution. The cost involved in making and attaching the hardened surfaces which dictate special and expensive materials and concomitant heat-treating, hardening and grinding, the fact that hardened ways are inclined to be sticky and often freeze because there are no inherent voids to retain the lubricant, and the fact that linear slides of this nature tend to have a high "break-away" friction are factors militating against their use.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

FIGURE 7 is an enlarged sectional view of parts of FIGURE 5 taken on the broken line 7—7 of the opposite carriage track way members;

FIGURE 8 is a fragmentary sectional view taken on the line 8—8 of FIGURE 7;

FIGURE 9 is a transverse sectional view taken on the line 9—9 of FIGURE 8;

FIGURE 10 is a fragmentary side elevational view of the end assembly;

Figure 1:
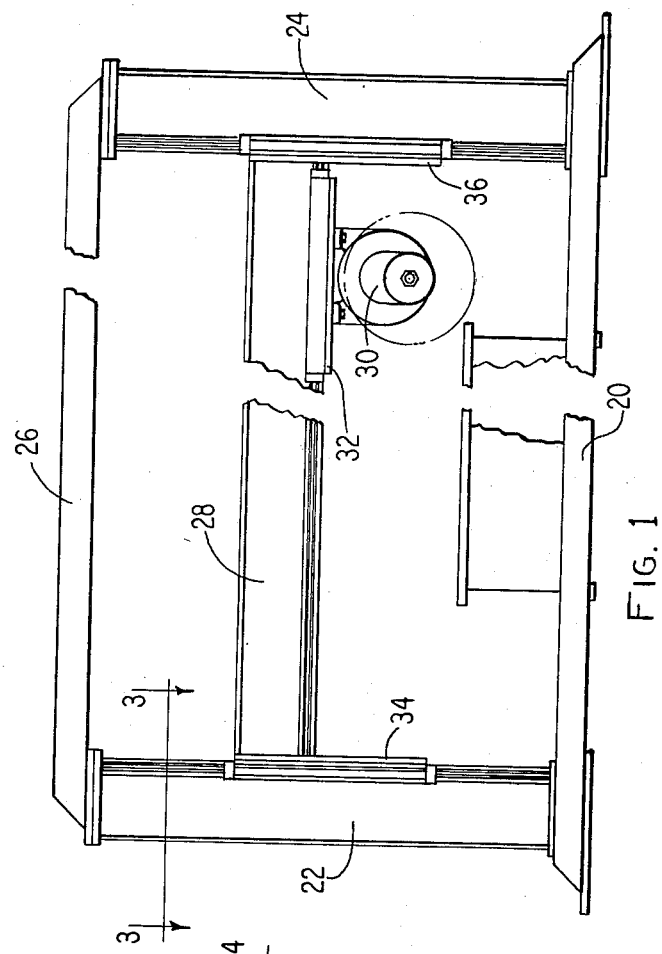
FIGURE 1 is a side elevational view, contracted in length of a heavy traverse saw employing the anti-friction ways.
Figure 3:
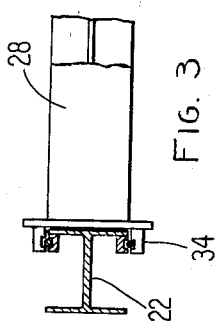
FIGURE 3 is a transverse section taken substantially on the line 3—3 of FIGURE 1.
Figure 2:
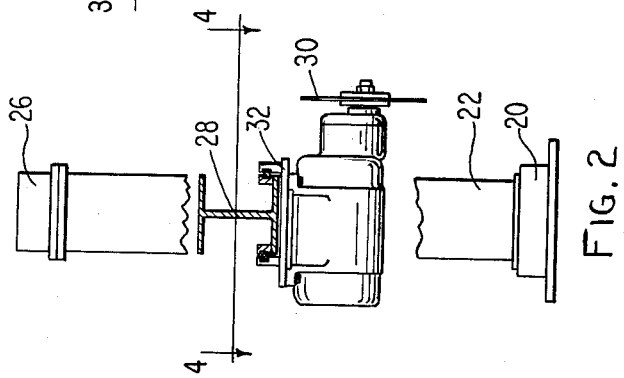
FIGURE 2 is an end elevational view of FIGURE 1 with parts broken away.

Referring to the drawings and FIGURES 1–3 inclusive there is shown a traverse type cutting machine having a power saw and comprising a bed 20, I beam uprights 22 and 24 and a tie member 26. Between the supports is an elevatable I beam 28 from which is hung a travelling rotary saw 30, the saw being slung from a carriage plate 32. The ends of the I beam 28 are affixed to travelling carriages 34 and 36 moving along the inside faces of the uprights 22 and 24. Each of the carriages 32, 34 and 36 are similar in form and are provided along their opposite sides with anti-friction bearing guideways cooperating between the carriages and their respective I beams, 22, 24 and 28 upon which they ride and with which they are associated.

Figures 4, 5:
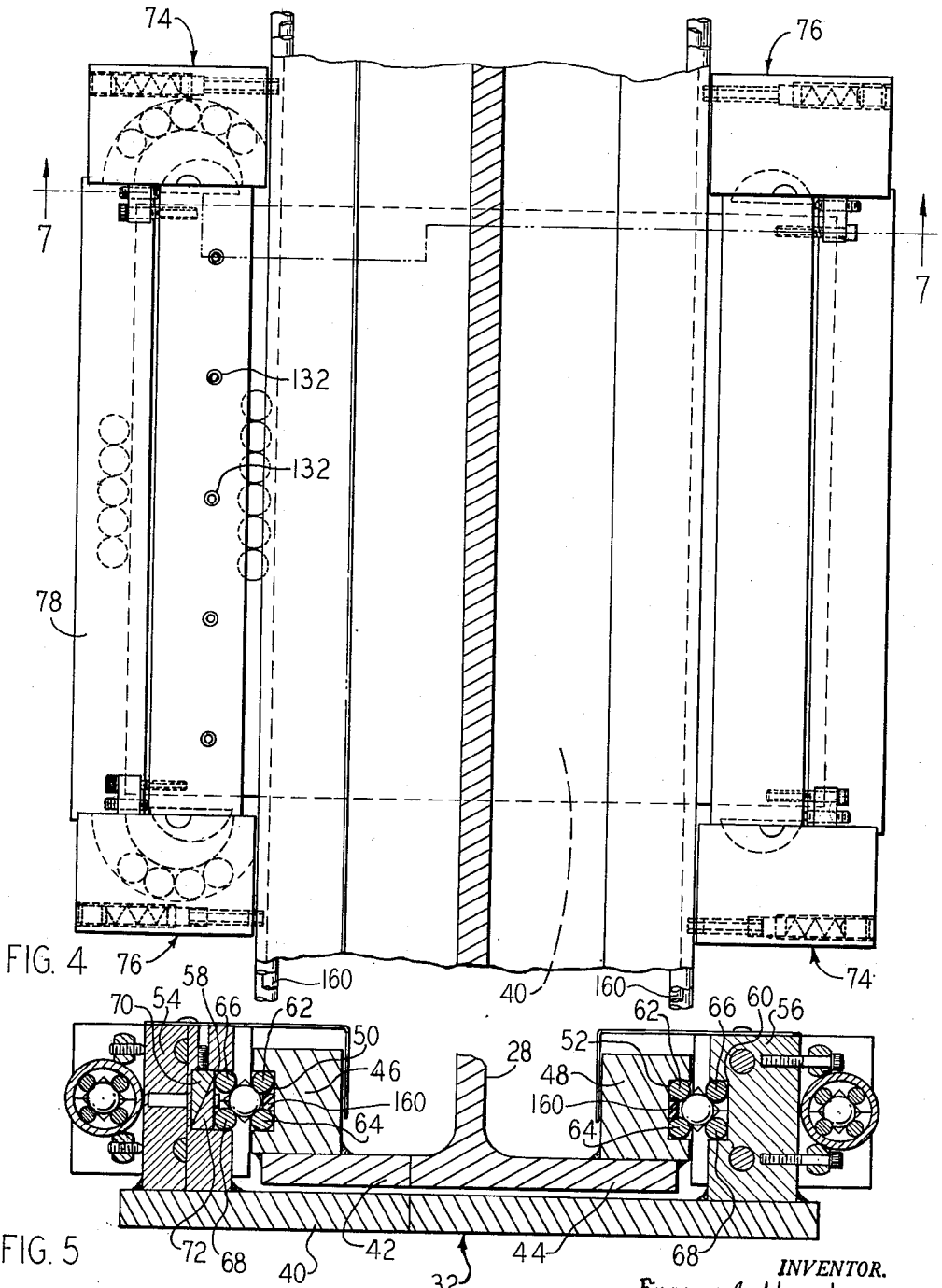
FIGURE 4 is a longitudinal horizontal sectional view taken substantially on the line 4—4 of FIGURE 2.
FIGURE 5 is a sectional view taken on the broken section line 7—7 of FIGURE 4.

As shown in FIGURES 4 and 5, each carriage such as 32, 34 and 36 may be a heavy plate 40, disposed in spaced relation to, but parallel with the end flanges 42 and 44 of the I beam upon which it travels, which for the purpose may be the beam 28. The flanges 42 and 44 are provided with heavy members or rails 46 and 48 extending the length of the I beam, or to such length as is necessary to provide the travel desired. Each of the members 46 and 48 are welded or otherwise secured to the flanges, and are each provided with a channel groove 50 and 52 respectively in their outer faces, which grooves extend the length thereof. The carriage plate 32 is also provided with members 54 and 56 rigidly affixed thereto as by welding or otherwise and extending along the edges thereof in spaced relation sufficient to clear the width of the flanges 42 and 44 of the beam 28. Such members 54 and 56 are provided with channel grooves 58 and 60, extending the length thereof on their respective inside faces, the channel grooves 58 and 60 being adapted to face the grooves 50 and 52. Each of the grooves 50 and 52 and grooves 58 and 60 are accurately machined so as to extend parallel with one another for reasons which will be readily understood.

In each of the grooves 50 and 52 there are disposed two spaced preferably hardened round bars 62 and 64, bearing against the upper and inner faces and inner and lower faces of the grooves respectively. Such rods are of uniform section throughout their length and secured in the grooves in any suitable manner at spaced points along their length and provide a track way. Similarly the grooves 58 and 60 of the members 54 and 56 are provided with rods 66 and 68 of uniform cylindrical section, preferably hardened, and of the same length as the members 54 and 56 and provide a track way. It will be seen that the channel or groove 58 is deeper than the groove 60, and provided with cooperating wedge sectioned strips 70 and 72 extending along the length of the channel. Vertical adjustment of the strip 70, varies the lateral position of the strip 72, to provide lengthwise adjustable depth of the portion of the channel or groove in which the rods 66 and 68 lie, whereby 66 and 68 in the opposed members 54 and 56 may be adjusted to parallelism. Disposed between the rods 62 and 64 and rods 66 and 68 on each side of the carriage are a series of anti-friction balls, which are adapted to roll along the respective rods or track ways to provide the anti-friction support.

Return track ways for the balls are provided on the carriage, such track ways having semi-circular tracks at either end of the members 54 and 56 formed in suitable end block assemblies 74 and 76, and a connecting track way 78 extending between the blocks, parallel with the rods 58 and 60, but laterally disposed therefrom. The loop track way thus provided is substantially filled with anti-friction balls, generally, in direct contact with adjacent balls.

Figure 6:
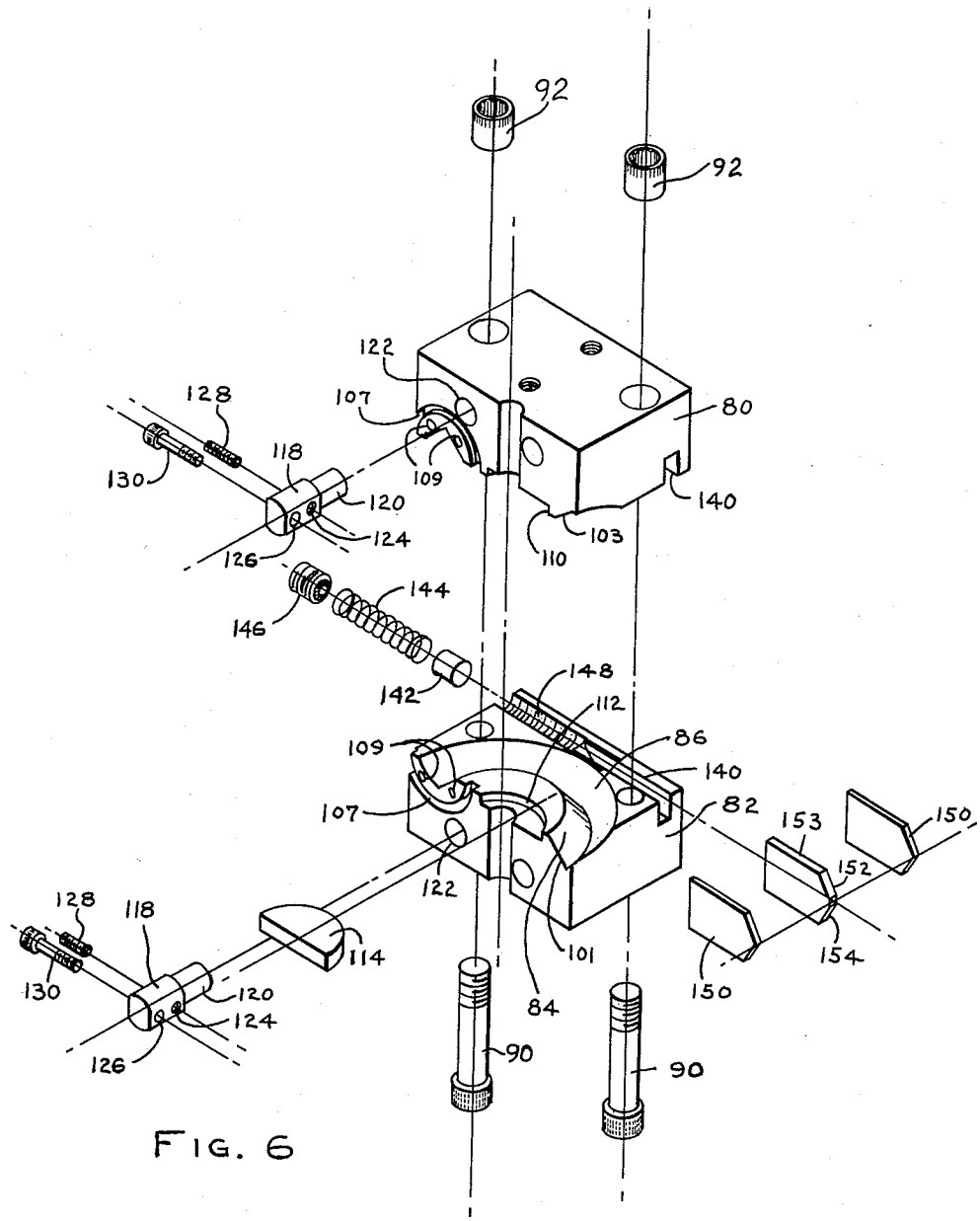
FIGURE 6 is an exploded perspective view of the end assembly of the ball return loops.

As shown in FIGURES 6 and 7 at each end of the members 54 and 56 are positioned the semi-circular track way assemblies 74 and 76, the same being secured in abutting relation, both with respect to the members 54 and 56 as well as the rods 66 and 68. Each of the assemblies 74 and 76 comprises a pair of blocks 80 and 82 providing together, a semi-circular generally square sectioned groove formed by the walls 84 and 86 which may be conical, or otherwise, as desired. The opposed semi-circular grooves, when the blocks are assembled, present a track way, the radial section of which is square as shown, but which could be circular or otherwise as desired, and of such size as to freely allow the anti-friction balls 88 to freely roll therethrough. The blocks are secured together by bolts 90 and nuts 92, and the blocks when assembled are bolted to the respective ends of the members 54 and 56 as by studs 94 and 96 and thereby retain rods 66 and 68 and confine the same against lengthwise movement. The apertures 98 and 100, in the blocks 80 and 82 are slotted transversely as indicated, or are enlarged, to provide a range of adjustment, to permit accurate alignment of the blocks with the ends of rods 66 and 68 so as to tangentially align the ends 101 and 103 of the conical surfaces 84 of the upper and lower semi-circular track way with the elemental ball engaging surfaces of the rods 66 and 68.

The other ends of the semi-circular track ways lead into a tubular housing 106 preferably containing four guide rods 108 disposed to form a track way for the anti-friction balls returning from one end block 74 to the other end block 76 or vice versa. The rods 108 preferably have their ends reduced and set in apertures 109 in the blocks 80 and 82, and an annular groove or recess 107 in the blocks is adapted to receive the tubular housing 106. The blocks are together provided with semi-circular recesses 110 and 112 to receive a semi-circular aligning key 114, the exposed diametral portion of which is received in a transverse slot 116 in the ends of the members 54 and 56, and the slot 116 and key 114 together serve to align the ends of the members 54 and 56 vertically with respect to the end assemblies 74 and 76.

Each of the end blocks 80 and 82 is provided with pin extensions 118 having shanks 120 having a drive fit in apertures 122. The pin ends are provided with a threaded aperture 124 and a plain aperture 126 to receive a set screw 128 and headed screw 130 respectively. The members 54 and 56 are provided with threaded apertures 131 aligned with the aperture 126, to receive the screw 130. The set screws bear against the sides of the members 54 and 56, and are adapted to thrust the members laterally, while the screws 130 are adapted to draw the members laterally, and together provide means for laterally adjusting the members 54 and 56 with respect to the end assemblies 74 and 76 so as to accurately align the ends 101 and 103 of the conical face surfaces 84 tangentially with the ends of the rods 66 and 68. It will be understood that the studs 94 and 96 will initially be drawn up lightly, following which the set screws 128 and screws 130 are manipulated to slide the end assembly laterally relative to the members 54 and 56, the keys 114 guiding such motion, until the ends of the rods 66 and 68 accurately line up tangentially with the ends 101 and 103 of the conical walls 84 of the semi-circular tracks.

The member 54, with the wedge strips 70 and 72, provides for correctly spacing the rods 66 and 68 of the member 54, with respect to the rods 66 and 68 of the member 56 so as to correctly space the carriage rods or track ways with respect to the rods 62 and 64 of block 46 and rods 62 and 64 of block 48 forming the track ways on the flanges 42 and 44 of the I-beam 28. In practice, the spacing will be adjusted by the wedge strips so as to provide a desired amount of preloading of the balls in their opposed track ways.

Set screws 132 disposed along the member 54 at spaced intervals are adapted to bear against the wedge strip 70 to cam the wedge strip 72 to provide the proper location or preloading of the rods 66 and 68 of the member 54 so that the balls actively supporting the carriage will bear with proper pressure against the track way rods 66 and 68 of the carriage and the track way rods 62 and 64 of the supporting beam 28. It will be appreciated that the adjustment of the end blocks 74 and 76 on the opposite ends of member 54 will require final adjustment once the proper spacing of the track ways and desired preloading is established by the adjustment of the wedge strips 70 and 72.

It will be appreciated that the rods 62 and 64 of the beam are exposed except in the region covered by the carriage, and thus liable to gather foreign matter that might interfere with the easy rolling of the anti-friction balls thereon. Each of the end assemblies is provided with a wiper adapted to engage the rods 62 and 64 in order to clean the surfaces thereof which form the track way for the balls. The blocks 80 and 82 are provided with a transverse slot 140 in which is slidably disposed a wiper blade 142. The blade is backed up by a plunger 143, spring 144, and set screw 146, disposed in a threaded aperture 148 which is axially aligned with the slot at its inner end. The blade is provided with facing material on either side thereof such as fish paper or nylon or a thin brass plate as indicated at 150 to support a soft core while the core 153 itself may be of resilient neoprene. The end of the blade is shaped as at 152 and 154 so as to wear in and wipe the proper elemental surface portions of the rods 62 and 64, that are actually engaged by the rolling balls 88.

If desired, a strip of resilient material such as felt or neoprene, as at 160 may be disposed in the space between the rods 62 and 64 to guard against entrance of foreign matter behind the rods 62 and 64. It will also be seen that the return tubes 78, with the spaced support rods, 108 provide ample space for lubricant, or the deposit of foreign matter, so that attention free service may be had over a long period of time.

Figure 11:
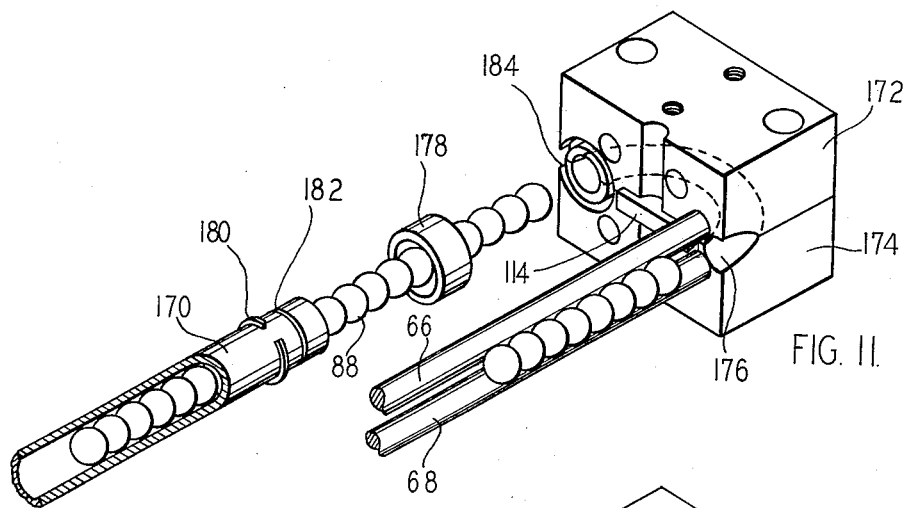
FIGURE 11 is a fragmentary perspective, exploded view of a modified form of return loop.
Figure 12:
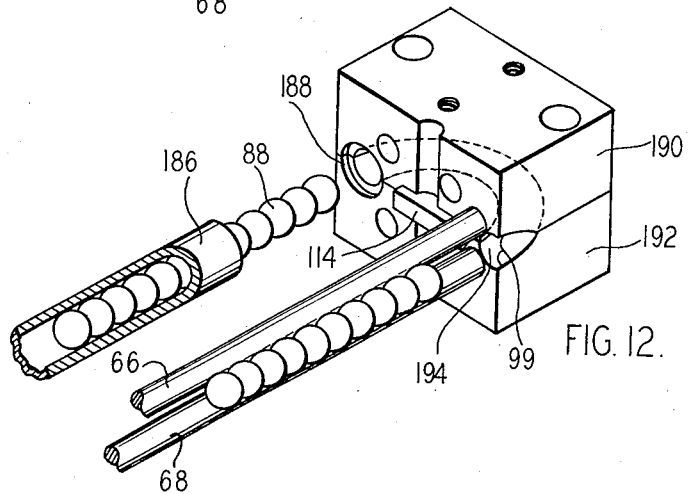
FIGURE 12 is a further fragmentary perspective exploded view of a further modified form of return loop.

In FIGURES 11 and 12 there are shown forms of the invention wherein the return tubes are of an internal diameter sufficient to freely receive the balls, and in which the track way rods 108 are eliminated. In FIGURE 11, the tube 170, and the blocks 172 and 174 have a semi-circular track 176 of circular cross section. A sleeve 178, adapted to abut the split ring 180, when in the groove 182, extends beyond the end of the tube 170, to seat in the annular groove 184, and thereby hold the alignment of the tube 170 in true tangential relation with the semi-circular track way end. In FIGURE 12, the sleeve 178 is dispensed with, and the end of the tube 186 seats in an annular shallow shoulder groove 188 in the blocks 190 and 192, the depth of the groove being insufficient to seriously effect the tangential alignments of the tube 186 with the arcuate path 194, within the blocks 190 and 192. In each of the forms, there is provided a key 114 to fix vertical alignment, and to provide for lateral tangential adjustment.

From the foregoing it will be seen that the carriage is continually provided with a maximum number of supporting balls to provide maximum support from the supporting member. In each case the lips 99 at the entrance of the semi-circular track ways of the end members overhang sufficiently to carry each ball as it arrives into the arcuate track way. At the same time, the tangential arrangement of the opposed surfaces 84 with the ends of their respective rods 66 and 68 feed the balls one by one into load sustaining position with a smooth anti-friction rolling movement.

Although several embodiments depicting some of the more rugged types of construction of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a lineal anti-friction bearing, a support member, a carriage member mounted for movement therealong, spaced track way rods mounted on said support member, spaced track way rods mounted on said carriage member, anti-friction balls disposed along and in contact with said track way rods; a return loop for said balls mounted on said carriage member comprising semi-circular track forming end members, said members being cut away on the side facing said support member track way rods, to clear said rods, and said members, and a connecting track laterally disposed from said carriage member track way rods, and means for aligning the end of the end member semi-circular track way of each of said end members tangentially in respect to said carriage member track way rods.

2. In a lineal anti-friction bearing, a support member, a carriage member mounted for movement therealong, spaced track way rods mounted on said support member, spaced track way rods mounted on said carriage member, anti-friction balls disposed along and in contact with said track way rods; a return loop for said balls mounted on said carriage member comprising semi-circular track forming end members, said members being cut away on the side facing said support member track way rods, to clear said rods, and said members, and a connecting track laterally disposed from said carriage member track way rods, and means for aligning the end of the end member semi-circular track way of each of said end members tangentially in respect to said carriage member track way rods, said means including means for confining the alignment to relative movement in a plane parallel to the plane of symmetry between the spaced carriage member track way rods.

3. A lineal anti-friction bearing comprising a support member, a carriage member, each having facing channels, pairs of cylindrical rods disposed in said channels, and a series of anti-friction balls disposed between and in contact with said pairs of rods, means for adjusting the spacing between said support member and carriage member pairs of rods, and a return track way for said balls mounted on said carriage member, said track way comprising end blocks secured to the ends of said carriage member having semi-circular track ways therein tangentially aligned with said rods, and a tubular track way connecting said end blocks terminating at the ends of said semi-circular track ways.

4. A lineal anti-friction bearing comprising a support member, a carriage member, each having facing channels, pairs of cylindrical rods disposed in said channels, and a series of anti-friction balls disposed between and in contact with said pairs of rods, a pair of elongated wedge sectioned members disposed in one of each pair of facing channels behind the rods including means for moving said members relative to one another crosswise of the channel at frequent intervals along the length of the channel for adjusting the spacing between said support and carriage pairs of rods, a return track way for said balls mounted on said carriage member, said track way comprising end blocks secured to the ends of said carriage member having semi-circular track ways therein, and a tubular track way connecting said end blocks, and means for keying said end blocks to said carriage member, for movement toward and away from said carriage pair of rods.

5. A lineal anti-friction bearing comprising a support member, a carriage member, each having facing channels, pairs of cylindrical rods disposed in said channels, and a series of anti-friction balls disposed between and in contact with said pairs of rods, a pair of elongated wedge sectioned members disposed in one of each pair of facing channels behind the rods including means for moving said members relative to one another crosswise of the channel at frequent intervals along the length of the channel for adjusting the spacing between said support and carriage pairs of rods, a return track way for said balls mounted on said carriage member, said track way comprising end blocks secured to the ends of said carriage member having semi-circular track ways therein, and a tubular track way connecting said end blocks, and means for effecting gradual relative movement between the end blocks and said carriage members for aligning the inside faces of the semi-circular track way with said carriage member rods.

6. A lineal anti-friction bearing comprising a support member, a carriage member, each having facing channels, pair of cylindrical rods disposed in said channels, and a series of anti-friction balls disposed between and in contact with said pairs of rods, a pair of elongated wedge sectioned members disposed in one of each pair of facing channels behind the rods including means for moving said members relative to one another crosswise of the channel at frequent intervals along the length of the channel for adjusting the spacing between said support and carriage pairs of rods, a return track way for said balls mounted on said carriage member, said track way comprising end blocks secured to the ends of said carriage member having semi-circular track ways therein, and a tubular track way connecting said end blocks, means for keying said end blocks to said carriage member, for movement toward and away from said carriage pair of rods, means for effecting gradual relative movement between the end blocks and said carriage members for aligning the inside faces of the semi-circular track way with said carriage member rods.

7. A lineal anti-friction bearing comprising a support member, a carriage member, each having facing channels, pairs of cylindrical rods disposed in said channels, and a series of anti-friction balls disposed between and in contact with said pairs of rods, a return track way for said balls mounted on said carriage member, said track way comprising end blocks secured to the ends of said carriage member having semi-circular track ways therein, said blocks being cut away on the side facing said support member rods to clear said rods, and a tubular track way connecting said end blocks, and means for keying said end blocks to said carriage member, for movement toward and away from said carriage pair of rods whereby to facilitate tangential alignment of said block track way with said carriage rods.

8. In a lineal anti-friction bearing, a support member having track way supporting rails, pairs of spaced rods mounted on and extending along said rails, a carriage adapted for movement along said support member, said carriage having rod supporting members, each having a pair of spaced rods disposed in spaced relation to a corresponding pair of rail supported rods, anti-friction balls disposed between and in contact with each of the rail supported pairs of rods and their respective carriage supported pairs of rods, means for adjusting one of the carriage supported pairs of rods toward and away from the corresponding rail supported rods, and a return track way for each of said carriage supported pairs of rods, said return track way comprising end blocks having semi-circular track ways formed by conical surfaces tangentially aligned with said carriage rods, said blocks being cut away on its support member side to clear the support member rods and a connecting track way laterally disposed from said carriage supported rods terminating at the ends of said semi-circular trackways.

9. In a lineal anti-friction bearing, a support member having track way supporting rails, pairs of spaced rods mounted on and extending along said rails, a carriage adapted for movement along said support member, said carriage having rod supporting members, each having a pair of spaced rods disposed in spaced relation to a corresponding pair of rail supported rods, anti-friction balls disposed between and in contact with each of the rail supported pairs of rods and their respective carriage supported pairs of rods, means for adjusting one of the carriage supported pairs of rods toward and away from the corresponding rail supported rods, a return track way for each of said carriage supported pairs of rods, said return track way comprising end blocks having semi-circular track ways and a connecting track way laterally disposed from said carriage supported rods, said blocks being cut away on the side facing said support member rods to clear said rods and means for tangentially aligning the trackways of said end blocks in respect to said carriage supported rods.

10. In a lineal anti-friction bearing a support member having track way supporting rails, pairs of spaced rods mounted on and extending along said rails, a carriage adapted for movement along said support member, said carriage having rod supporting members, each having a pair of spaced rods disposed in spaced relation to a corresponding pair of rail supported rods, anti-friction balls disposed between and in contact with each of the rail supported pairs of rods and their respective carriage supported pairs of rods, means for adjusting one of the carriage supported pairs of rods toward and away from the corresponding rail supported rods, a ball return track way for each of said carriage supported pairs of rods, said return track way comprising end blocks having semi-circular track ways and a connecting track way laterally disposed from said carriage supported rods, said blocks being cut away on the side facing said support member rods to clear said rods and means mounted on said end blocks and engaging said carriage supporting members for tangentially aligning the trackways of said end blocks in respect to said carriage supported rods.

11. In a lineal anti-friction bearing, a support member, a carriage member mounted for movement therealong, spaced track way members disposed on said support member, spaced track way members disposed on said carriage member, in spaced relation to the support member track way members, anti-friction balls disposed along and between said track way members and in contact therewith, a return loop track for said balls mounted on said carriage member, said return loop track comprising a confining track disposed substantially parallel to and in spaced relation from said carriage track way members, end members having semi-circular trackway mounted on said carriage member, connecting with said confining track and the ends of said carriage track way members, said end members having trackways formed in part by opposed conical surfaces aligned tangentially at one end with the carriage trackway members and having means extending beyond the center line of said balls disposed between said track way members for guiding balls into and from the return loop track and means for keying said members with the center plane of said semi-circular trackways with the center plane of said carriage member trackway members.

12. In a lineal anti-friction bearing as set forth in claim 5 a resilient strip of material disposed between and along and in contact with at least one pair of said spaced trackway rods.

References Cited in the file of this patent

UNITED STATES PATENTS

| 1,938,786 | Vancil | Dec. 12, 1933 |
| 1,957,472 | Pankratz | May 8, 1934 |
| 1,991,177 | Rutz | Feb. 12, 1935 |
| 2,626,540 | Eserkaln | Jan. 27, 1953 |
| 2,672,378 | McVey | Mar. 16, 1954 |
| 2,672,379 | McVey | Mar. 16, 1954 |
| 2,929,661 | Brown | Mar. 22, 1960 |

FOREIGN PATENTS

| 214,797 | Australia | May 5, 1958 |
| 703,762 | Great Britain | Feb. 10, 1954 |
| 1,045,283 | France | June 24, 1953 |
| 1,073,668 | France | Mar. 24, 1954 |